United States Patent [19]
Eckert

[11] 3,739,551
[45] June 19, 1973

[54] METHOD OF GAS ABSORPTION AND APPARATUS THEREFOR

[75] Inventor: John S. Eckert, Silver Lake, Ohio

[73] Assignee: Norton Company, Akron, Ohio

[22] Filed: Nov. 16, 1970

[21] Appl. No.: 90,087

[52] U.S. Cl. .................. 55/90, 55/94, 55/233, 55/259, 261/94, 261/98, 261/116
[51] Int. Cl. .............................................. B01d 47/06
[58] Field of Search ........................... 55/90–94, 71, 73, 233, 242, 259; 261/94–98, 116, 100, 105

[56] References Cited
UNITED STATES PATENTS

| | | | |
|---|---|---|---|
| 1,788,306 | 1/1931 | Kline | 261/98 |
| 2,127,645 | 8/1938 | Kinney et al | 261/94 |
| 2,834,466 | 5/1958 | Hament | 261/95 |
| 3,134,825 | 5/1964 | Sexton | 261/98 |
| 489,450 | 1/1893 | Bentley | 261/98 |
| 2,143,016 | 1/1939 | Kleinschmidt | 55/233 |
| 2,332,224 | 10/1943 | Heath et al | 261/94 |
| 2,803,528 | 8/1957 | Erdmann | 261/98 |
| 3,006,436 | 10/1961 | Starbuck et al | 55/233 |
| 3,064,408 | 11/1962 | Erga et al | 55/71 |
| 3,210,914 | 10/1965 | Eckert | 55/94 |
| 3,268,296 | 8/1966 | Hall et al | 55/94 |
| 3,353,799 | 11/1967 | Lions et al | 261/116 |

*Primary Examiner*—Bernard Nozick
*Attorney*—Meyer, Tilberry and Body

[57] ABSTRACT

A liquid-gas contacting apparatus has a liquid spray-nozzle which sprays liquid cocurrently with the gas to be contacted, a packed bed adapted to detrain the liquid and trickle it in counter-current flow against the gas, and an unpacked section of the apparatus providing a falling film of liquid along the walls to counter-currently contact the gas. The method comprises carrying out in a single item of equipment, by the sequence of cocurrent spray contacting, followed by counter-current contacting in a packed bed, and counter-current falling film contacting by means of a wetted wall technique. Vertical and horizontal scrubbers are provided which are adapted to remove noxious fumes from air.

18 Claims, 4 Drawing Figures

United States Patent [19]
Eckert
[11] 3,739,551
[45] June 19, 1973
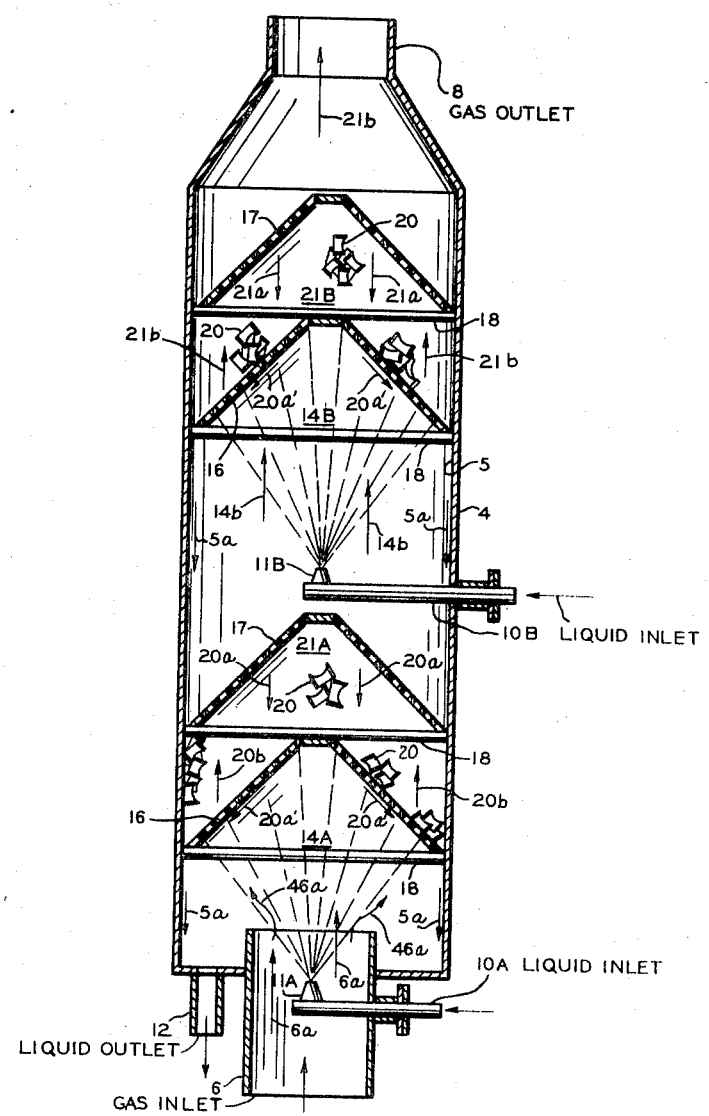

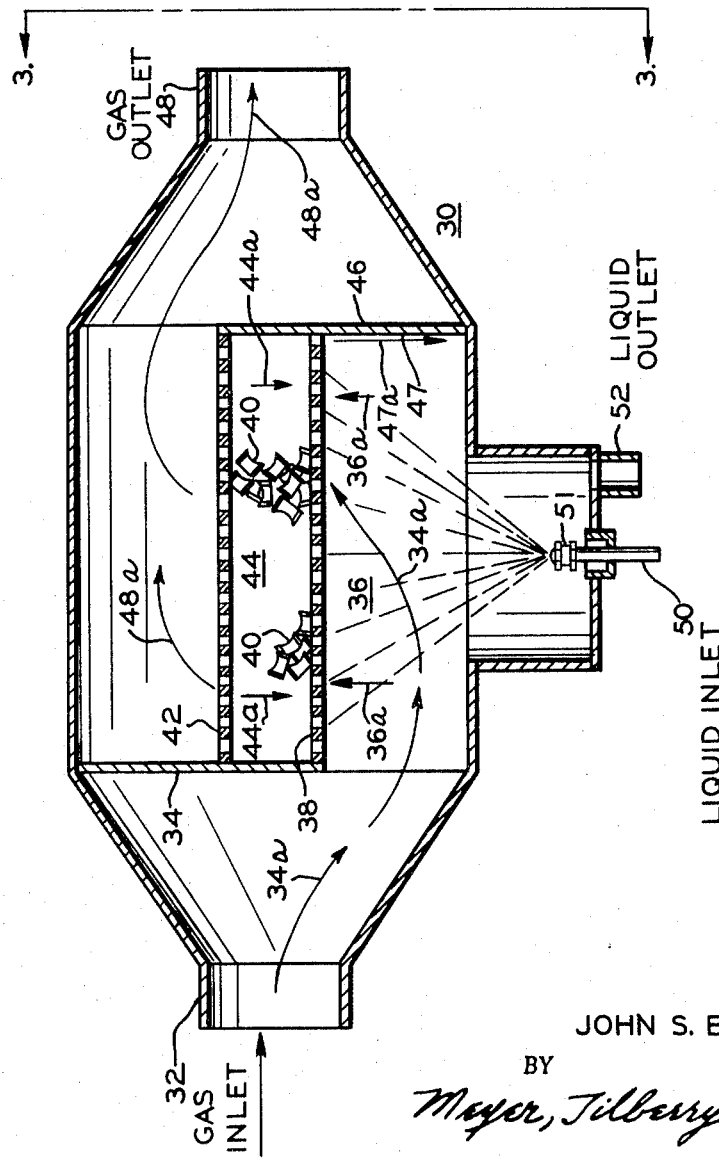

METHOD OF GAS ABSORPTION AND APPARATUS THEREFOR

The present invention pertains to the art of bringing a liquid and a gas into intimate contact to effect mass transfer and/or heat transfer between the liquid and gas.

The invention is particularly applicable to absorbing gases into a liquid.

The invention is further particularly applicable to fume scrubbers adapted to remove noxious fumes from air, and will be described with particular reference thereto although it will be appreciated that the invention has other applications such as mass and heat transfer between liquids and gases in general, and gas absorption into a liquid in connection with chemical and industrial processes in general.

In gas absorption, a vapor which is soluble in a liquid is absorbed into the liquid from a mixture of the vapor with an inert gas. For example, the washing of ammonia vapor from a mixture of ammonia and air by means of liquid water is an example of a gas absorption process wherein the ammonia is preferentially absorbed into the water from air, which is much less soluble in water than is ammonia.

The apparatus most commonly used in gas absorption operations is a packed tower, which comprises essentially a cylindrical tower filled with a tower packing or filling. The packing may be any one of a number of well known shapes such as crushed, solid, random-shaped particles, cylinders, rings, saddles, and the like. Typical examples are the saddles and rings known as Berl saddles and Raschig rings. While any packing material shape may be employed, a saddle shape or the like is preferred, and a preferred saddle is the type sold under the trademark INTALOX by the Norton Company. In this type of saddle, a length of material is formed into an arcuate shape which is essentially U-shaped in cross section and curved along its longitudinal axis so that a transversely concave surface and a transversely convex surface are formed on opposite sides of the saddle. In more mathematical terms, the saddle may be said to comprise a segment of the inner peripheral portion of a hollow toroid having sides flaring outwardly from the axis of the toroid to its edges and with the sides having a convex surface towards the toroid axis and a concave surface away from the toroid axis. The saddle may also have ribs on its sides and scallops along its edges to aid liquid-gas contact, as set forth in detail in U.S. Pat. No. 3,232,589 issued Feb. 1, 1966 and assigned to the assignee of this application.

The inlet liquid, which may be a pure solvent-liquid, i.e., a liquid which is free of the solute gas, or may be a weak solution of the solute in solvent, is usually distributed over the top of the packing and trickles downwardly therethrough. The gas containing a vapor which is to be absorbed is passed upwardly through the tower in counter-current flow to the descending liquid. Ideally, the descending liquid should uniformly wet the tower packing elements thereby effecting intimate liquid-vapor contact between the rising vapor and the descending liquid. By this means, the vapor contained in the gas is absorbed into the liquid which is removed from the bottom of the tower.

Such counter-current contacting has the advantage of providing a large driving force for absorption of the vapor into the liquid. That is, a greater rate of absorption is attained by counter-current contacting as compared to cocurrent contacting. (As used in this specification and claims and as generally understood in the art, counter-current contacting means contacting wherein the gas and liquid streams move respectively in opposite directions, and cocurrent wherein the streams move in the same direction.) The main disadvantage of a packed tower is the pressure drop sustained by the gas due to the resistance of the tower packing and more significantly, the resistance of the downward flow of liquid. In order to obtain the required degree of absorption, the mass velocity of the gas moving into the tower must be high. That is to say, for a given tower diameter the velocity of the gas must be high in order to attain sufficient absorption in tower of reasonable height. In general, power costs vary directly with the cube of the gas velocity in a packed tower so the question of gas velocity and pressure drop is of important economic significance.

Another disadvantage of packed towers is tendency of the liquid trickling through the tower to channel. That is to say, rather than uniformly wetting each packing element in the tower, the liquid tends to gather into channels and cascade down through one portion of the tower, leaving the other portions dry. The surfaces of the channeled liquid tend to quickly become saturated with the solute gas and the channelled liquid thus fails to absorb vapors to the extent that would take place if the liquid were dispersed in thin films. Accordingly, the desired absorption rate is not attained.

Finally, it is known in packed towers there is an operational upper limit to the gas velocity which may be employed, even if higher velocities are economically justified. With a fixed liquid rate in a given tower, there exists a gas velocity (known as the flooding velocity) at which liquid is held up in the tower. When flooding velocity is attained, a solid column of liquid begins to form at the bottom of the tower. If this velocity is maintained or increased, the height of flooding rises until, when it reaches the top of the tower, the tower is in effect converted from a packed tower into a liquid-filled column through which a gas is being bubbled.

Gas absorption may also be carried out in an empty, i.e., non-packed, chamber into which the liquid and gas are introduced. The liquid is sprayed or otherwise broken up into small droplets to provide a large surface area for contact with the gas. This method of contacting has the advantages of low pressure drop and inexpensive construction. Because of entrainment of the liquid in the gas stream however, true countercurrent action is not attainable in such equipment (which may be referred to generally, as spray chambers) even when the gas and liquid are introduced respectively, from opposite directions within the chamber. Often, the liquid and gas are introduced concurrently, but even when they are not, spray towers are effectively cocurrent contacting devices because of the entrainment of the spray into the gas.

Cocurrent contacting devices, i.e., spray towers, also have the advantage that extremely high gas velocities may be used without danger of flooding. The liquid must however, be broken up into fine particles to provide the requisite liquid surface area for contact, and this may be done by introducing the liquid by a spray nozzle, or by impacting the liquid with the high velocity gas. Such cocurrent contacting has the disadvantages however, that the absorption rates are not as high as with counter-current contacting, thereby requiring larger equipment installations for a given process, and provision must be made to separate entrained liquid from the gas.

Another method of contacting a liquid with a gas is to flow the liquid in a thin film down the surface of tubes or the walls of a vessel. The gas may be flowed either cocurrently or counter-currently with the liquid film. Such falling film or wetted wall contacting as it is generally referred to, exposes a large surface area of liquid to the gas relative to the volume of liquid, and is frequently employed in evaporation processes.

It is seen from the foregoing that the prime desideratum in liquid-gas contacting in general, and in gas absorption processes in particular, is to break up the liquid into fine particles or thin sheets to effect intimate liquid-vapor contact, whereby mass and heat transfer in general, and the transfer of vapor from the gas into the liquid in particular, may be attained.

While mass and heat transfer operations by the liquid-gas contacting may be carried out between any liquids and gases or mixtures thereof, water is the most commonly used solvent liquid for gas absorption processes, although other liquids may be used. Water containing chemicals dissolved therein may be useful as, for example, where alkaline-containing water is used to scrub acid fumes from a gas or where acid-containing water is used to scrub alkaline fumes from a gas.

In accordance with the invention, there is provided a novel and efficient liquid-gas contacting apparatus which provides in a single piece of equipment the advantages of a packed column, a spray chamber and a falling film or wetted wall contactor, in order to efficiently and economically effect mass and/or heat transfer, e.g., gas absorption into a liquid.

In accordance with another aspect of the invention there is provided a vessel comprising a packed bed, the inlet surface of which bed is oriented at an angle to the direction of gas flow within the equipment, spray nozzle means to effect co-current contacting with the gas in a chamber which is free of packing, and a falling film of liquid adapted to contact the gas passing through the vessel.

It is a principle object of the present invention to provide a method for efficiently absorbing gas from a liquid in a novel and improved manner comprising a sequence of cocurrent contacting in a spray tower section, counter-current contacting in a packed bed section, and wetted wall counter-current film contacting.

It is another object of the invention to provide a method and apparatus for carrying out mass and/or heat transfer between a liquid and a gas.

It is yet another object of the invention to provide a scrubbing method and apparatus which is compact and efficient and particularly adapted to use in laboratory or other small volume applications, as opposed to large scale industrial use.

It is yet another object of the present invention to provide an apparatus which is novel, compact and adapted to economically carry out the method of the invention.

In general, the invention comprises introducing the gas to be scrubbed into the liquid-gas contacting vessel (hereinafter referred to for convenience as a scrubber although it may be used for operations other than simple scrubbing) at high velocity and cocurrently with the solvent liquid. The scrubber generally comprises an outer shell which contains and supports the various inlet and outlet means and packed beds of the invention. The inlet gas velocity may be high since the entry of the scrubber contains no packing and serves as a spray chamber. Therefore there is not a substantial pressure drop problem nor the danger of attaining a flooding velocity so the inlet gas may be introduced at high velocity whereby it impacts and entrains the liquid spray.

While the liquid is preferably introduced into the scrubber as a spray by means of spray nozzles, the high gas velocity may be utilized as by means of a venturi constriction, to break up a stream of liquid into fine droplets. The liquid spray and gas are thus cocurrently contacted in the spray chamber entry. Even where the liquid and gas are introduced into the spray chamber at an angle to each other rather than in parallel streams, the entrainment of the liquid into the gas stream effects cocurrent contacting. The intimately dispersed liquid preferentially absorbs from the gas the vapor components which are most soluble in the liquid.

The volume of the spray chamber may increase as the gas progresses therethrough, so that the gas velocity decreases prior to entry into the packed bed. In other words, the gas inlet may lead into a confined gas inlet section of the spray chamber wherein the liquid is contacted with the gas at a high velocity, and the liquid and gas may then pass into a second expanded section of the spray chamber. The entrained liquid and gas then impinge upon the packed bed section of the apparatus. The direction of gas and liquid spray entry into the packed bed is displaced from the perpendicular so that the cross sectional area of the gas stream as it impinges on the bed is increased, thereby reducing the pressure drop.

The liquid in the gas stream is entrained by the packed bed, collects thereon and trickles downwardly through the packing so that a counter-current liquid-vapor contacting is carried out. The packed bed thus serves both as a liquid detrainer for the spray chamber and as a separate contacting means. Liquid which emerges from the bottom of the packed bed tends to run along the bottom of the packed bed support to surfaces such as, for example, the interior walls of the spray chamber, along which it descends against the upwardly rising gas in counter-current flow as a falling film of liquid. Additional surfaces such as tubes or plates may be provided to provide additional film surfaces down which the film of liquid may fall.

The scrubbed gas emerges from the packed bed and passes out of the scrubber. The liquid containing absorbed constituents therein flows out the bottom of the scrubber and may be discarded or treated to remove the dissolved constituents therefrom, and recycled for use in the scrubber.

The invention may employ one or more film surfaces, one or more spray chambers and one or more packed beds in alternating series in which case a additional spray or liquid injecting means are employed ahead of each bed. Generally, because of the high efficiency of the scrubber of the invention one or two packed beds, spray chambers and film surfaces will suffice.

It is thus seen that the invention comprises a highly efficient series of different types of liquid-gas contacting in order to attain the greatest amount of mass transfer in a single, relatively small piece of equipment. Tests have show that highly efficient removal of even trace quantities of contaminating fumes in air can be obtained by the use of scrubbing apparatus designed in accordance with the invention.

The invention may take form in certain parts and arrangements of parts which are described in detail herein and illustrated in the accompanying drawings wherein:

FIG. 2 is a schematic view in section of a horizontal air scrubber in accordance with the invention.

FIG. 3 is an end view along line 3—3 of FIG. 2.

Figure 1:
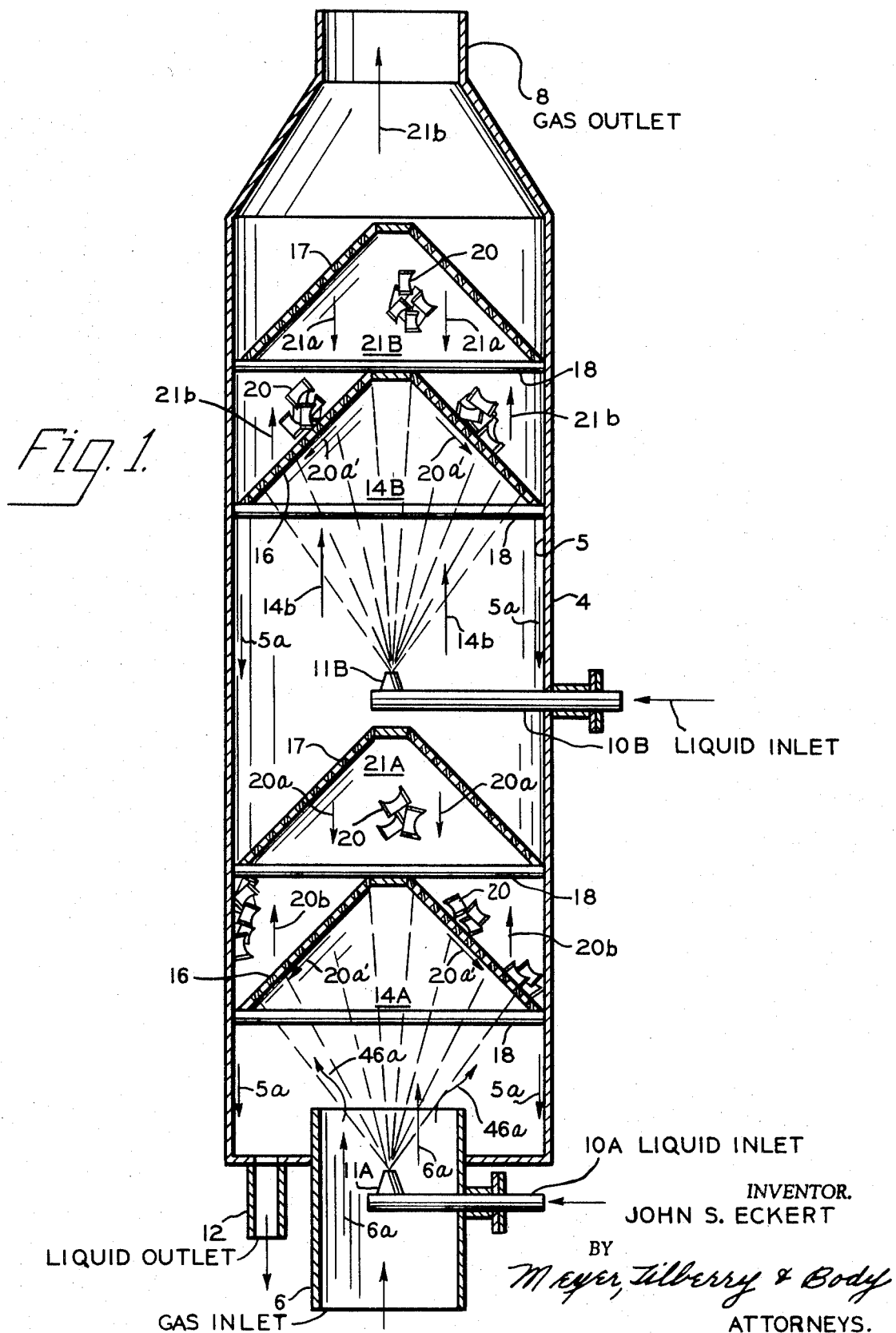
FIG. 1 is a schematic sectional view of a vertical air scrubber in accordance with the invention.

Referring now to the drawings, which are for the purpose of illustrating specific embodiments of the invention and not for the purpose of limitation thereof, FIG. 1 shows in sectional view a vertical scrubber comprising a generally cylindrical shell 4, a gas inlet 6, a gas outlet 8, liquid inlets 10A and 10B, and liquid outlet 12. Within shell 4 are disposed a first packed bed 21A, a second packed bed 21B, a first spray chamber 14A and a second spray chamber 14B.

The gas to be scrubbed is introduced via gas inlet 6. The scrubbing liquid is introduced as a spray via liquid inlet 10A and spray nozzle 11A. The liquid spray and inlet gas co-mingle in cocurrent flow in gas inlet 6 as shown by the arrows 6a.

Gas inlet 6 thus serves as a high gas velocity cocurrent spray chamber due to its relatively small diameter as compared to the remainder of the apparatus. As the gas and liquid enter lower spray-chamber 14A from gas inlet 6 in cocurrent flow relationship as shown by the arrows 14a, the velocity of the gas is reduced somewhat by virtue of the larger diameter of spray chamber 14A.

The cocurrently flowing gas and liquid spray then impinges upon outer packing retainer 16 which is supported by retainer support dowels 18. Packing retainers 16 (and 17) are perforated to permit gas to pass therethrough and preferably have a percentage open area at least as great as that of the packing they support. Packing retainer 16 is cone shaped which provides certain advantages as explained hereinbelow, and supports a suitable packing material 20 (preferably, though not necessarily plastic packing rings of the type sold under the trademark INTALOX by the Norton Company, the assignee of this application.) Upper packing ring retainer 17 is likewise supported by retainer support dowels 18. The entire packed bed comprising upper and lower retainers 16 and 17 supports 18 and packing material 20 is generally designated packed bed 21A. A second, corresponding packed bed is designated 21B. As shown, the packing retainer extends across the entire cross-sectional area of shell 4 and is shaped to form the packed bed in substantially the shape of a hollow cone.

The sprayed liquid is detrained by packing material 20, collects thereon and trickles back down through packing 20 in the direction shown by the arrows 20a and 20a'. The gas passes upwardly through packing material 20, as shown by arrows 20b, in counter-current flow relationship with the descending liquid.

The gas emerging from packed bed 21A passes upwardly into spray chamber 14, is cocurrently contacted with liquid introduced via liquid inlet 10B and spray nozzle 11B, as shown by arrows 14b. The cocurrently contacted gas and liquid then enters packed bed 21B.

Detrained liquid trickles back through the bed as shown by arrows 21a and 20a', while the gas passes through the bed and out of the vessel as shown by arrows 21b.

The liquid which trickles back through the beds 21A and 21B in counter-current contact with the upwardly flowing gases tends to collect along the inner surface 5 of shell 4. At least some of the liquid which descend through the center portion of the packed beds will tend to cling to lower packing retainers 16 and flow in the direction of arrows 20a' to inner wall 5. The liquid which drips down from lower retainers 16 is entrained in spray chamber type contact with the upwardly moving gas.

Descending films of liquid are formed along lower retainers 16 and wall surfaces 5 as shown respectively, by the arrows 20a and 5a.

The descending film of liquid has a large surface area exposed to the upwardly flowing gas in relation to its volume and further absorption of the soluble constituents of the gas stream into the liquid is attained thereby.

Descending liquid which passes through packed bed 21A and along surface 5 in the lower portion of spray chamber 14A is withdrawn via liquid outlet 12.

It is thus seen that the entering gas is subjected to cocurrent contacting with a liquid spray, is then passed into a packed bed in which the gas and liquid are counter-currently contacted, and the liquid then passed in a film down a wetted wall in counter-current flow to the upwardly moving gas.

By arranging the packed beds in a conical form, the gas entry surface of the bed is deflected from the perpendicular to the direction of gas flow, that is, the bed is tilted from the usual ninety degree angle between the bed gas-entry surface and the direction of gas flow. This reduces the pressure drop of the gas entering the bed, since a large effective entry surface is provided.

It has been found that highly efficient gas-liquid contacting may be attained by use of the invention. The novel combination of counter-current, cocurrent and falling film contacting within a single unit provides enhanced efficiency in effecting mass transfer. The Table below shows the removal of chemical vapors from air which is attained by employing the method and apparatus of the invention in a gas scrubber adapted for laboratory or other low volume use. The Table shows the high removal efficiencies which may be attained even with quite low concentrations of containment in the gas. It will be appreciated that the invention would apply equally well to large scale use as in industrial scrubbing or contacting processes.

Referring now to FIG. 2, there is shown in sectional view a horizontal scrubber generally designated 30.

The gas to be scrubbed enters via gas inlet 32, is deflected by first baffle 34 and enters spray chamber 36 (as shown by arrow 34a) wherein it is contacted with a liquid spray introduced via liquid inlet 50 and spray nozzle 51.

The liquid and gas are thus cocurrently contacted in spray chamber 36, and pass into packed bed 44 as shown by arrows 36a. It should be noted that although packed bed 44 is in substantially a horizontal position, the general direction of gas flow as shown by arrows 34a is at an angle to the bed so that the cross sectional area of the gas stream entering the bed is larger than would be the case if gas entry were effected at a right angle to the bed. The large area and shallow depth of the bed also enhance its pressure drop characteristics. It will be further noted that the gas velocity is greater at the inlet portion of spray chamber 36 than in the chamber as a whole.

Packed bed 44 consists of perforate lower packing retainer 38 and perforate upper packing retainer 42 with packing material 40 disposed therebetween.

Liquid is detrained by packing material 40 and trickles back downwardly through packed bed 44 as shown by arrows 44a. Liquid which drips lower from packing retainer 38 is again contacted in spray chamber 30 and a portion thereof is reentrained by the gas.

Liquid trickling downwardly from packed bed 44 tends to descend along inner surface 49 in FIG. 3 and along inner surface 47 of second baffle 46, as shown by arrows 47a (FIG. 2).

The gas flowing upwardly through spray chamber 36 is thus contacted with a descending film of liquid shown by arrows 47a (FIG. 2) and 49a (FIG. 3).

The gas emerging from packed bed 44 passes out of the vessel via gas outlet 48 as shown by arrows 48a (FIG. 2).

Experimentation has shown that the sequence of contacting steps carried out in the apparatus of the invention provides a process of high efficiency and low pressure drop.

Figure 4:
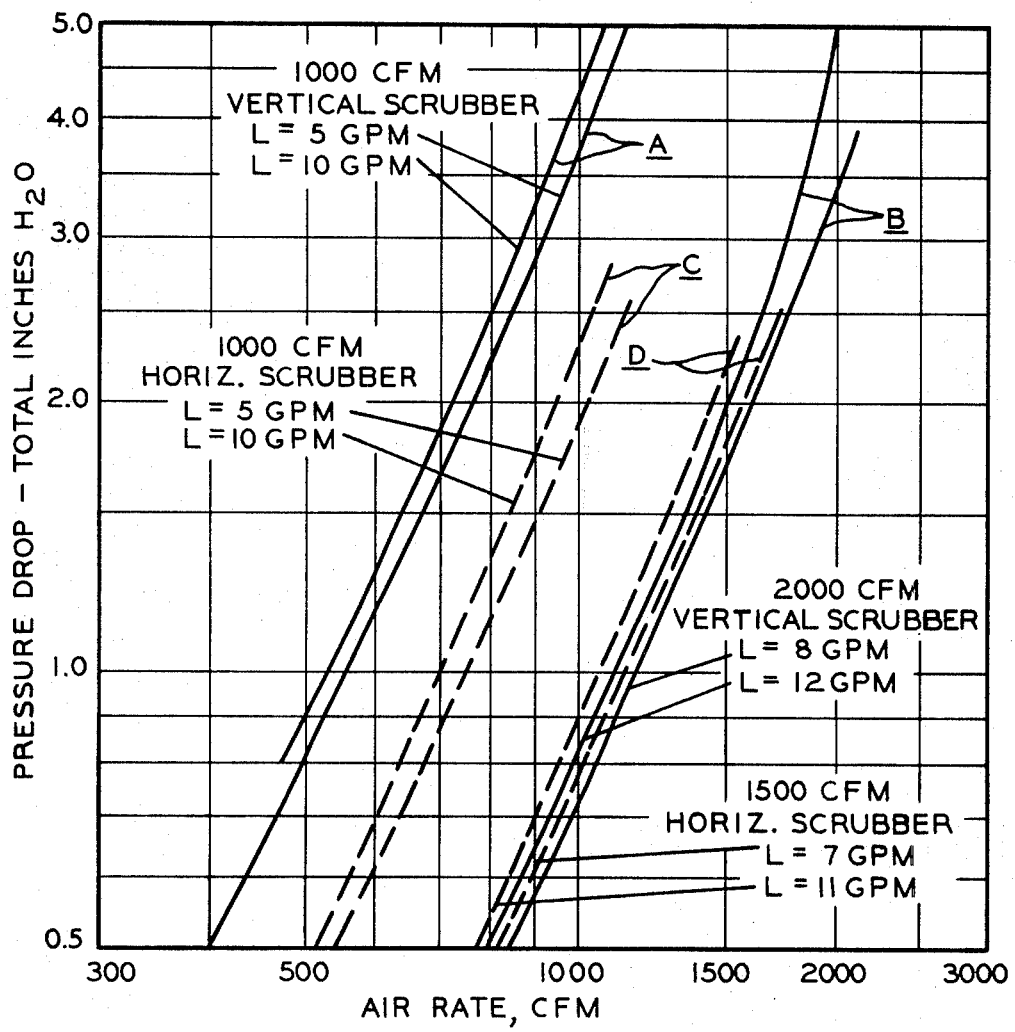
FIG. 4 is a graph of pressure drop of gas versus liquid flow rate in apparatus made in accordance with the invention.

In apparatus packed with plastic one inch saddles sold under the trade name INTALOX, FIG. 4 shows pressure drops obtained at various liquid (water) flow rates L, in gallons per minute and gas (air) flow rates G in cubic feet of gas per hour at standard conditions of temperature and pressure. Lines for a vertical scrubber of the general configuration shown in FIG. 1 are solid, and the lines for a horizontal scrubber of the general configuration shown in FIGS. 2 and 3 are dotted.

Lines A represent a vertical scrubber of 1000 CFM nominal capacity, lines B a vertical scrubber of 2000 CFM nominal capacity, lines C a horizontal scrubber of 1000 CFM nominal capacity and lines D a horizontal scrubber of 1500 CFM nominal capacity. It is seen that for a given gas rate a somewhat lower pressure drop is sustained by the gas treated in a horizontal scrubber than is sustained by gas treated in a vertical scrubber.

However, removal efficiencies are generally greater in vertical scrubbers than in horizontal scrubbers, the latter having efficiencies of about 90 to 95 percent of those of vertical scrubbers.

The Table gives typical removal efficiencies for vertical scrubbers for removal of the fumes shown from air by contacting with tap water. Horizontal units have a percent removal capability of 90 to 95 percent of those shown. Removal of alkaline vapors such as ammonia and acidic vapors such as $H_2S$, can be enhanced by adding an appropriate acid or alkaline neutralizing agent to the water.

TABLE

| 0.1% or Higher Concentration of Vapor in Air | Percent Removal of Vapor From Air in Vertical Scrubber at Air Rate (G) in CFM, Water Rate (L) in GPM | |
|---|---|---|
| | G=1000 and L=5, or G=2000 and L=8 | G=1000 and L=10, or G=2000 and L=12 |
| Ammonia | 75 | 88 |
| Hydrogen Chloride | 99 | 99+ |
| Sulphur Dioxide | 84 | 93 |
| Chlorine | 84 | 93 |
| Bromine | 84 | 93 |
| Alcohol | 85 | 95 |
| Hydrogen Fluoride | 95 | 98 |
| Hydrogen Sulfide | 30 | 55 |
| Acetone | 95 | 98 |
| Chloroform | 98 | 99 |
| Benzene | 95 | 98 |
| Petroleum Ether | 95 | 98 |
| Formaldehyde | 95 | 99 |
| Acetic Acid | 95 | 98 |
| Anodizing Solution Fumes | 99 | 99 |
| Alkaline Cleaner Fumes | 99 | 99 |
| Caustic Solution Fumes | 99 | 99 |
| Sulphuric Acid Fumes | 99 | 99 |
| Perchloric Acid Fumes | 99 | 99 |
| Nitric Acid Fumes | 90 | 99 |
| Cyanide Solution Fumes | 95 | 99 |
| Peracetic Acid Fumes | 95 | 99 |

The invention has been described with reference to specific embodiments thereof. It will be understood that upon reading and understanding the foregoing descriptions, many modifications and alterations within the spirit and scope of the invention of the embodiments disclosed will become apparent to those skilled in the art. It is intended to include all such modifications and alterations within the scope of the appended claims.

What is claimed is:

1. An apparatus for carrying out liquid-gas contacting comprising an outer shell containing a packed bed disposed therein, said outer shell being in flow communication with each of a liquid inlet means, a liquid outlet means, a gas inlet means, and a gas outlet means, the portion of said shell adjacent said gas inlet means comprising a spray chamber, said liquid inlet means being structurally associated with said shell so as to introduce liquid into said spray chamber, thence into said shell and upwardly into said bed in the form of a spray, said gas inlet means being structurally associated with said shell so as to introduce a gas into said spray chamber within said shell in cocurrent flow contact with said liquid and thence into said packed bed, said gas inlet means being of smaller cross sectional flow area than said spray chamber whereby the velocity of said gas in said gas inlet means is higher than the velocity of said gas in said spray chamber, said packed bed being positioned within said shell upon a perforated packing retainer which extends across the entire cross sectional area of said shell and which is shaped to form the packed bed in substantially the shape of a hollow cone so that the gas entry surface of said packed bed is defined by said packing retainer and is, by virtue of its cone shape, displaced from the perpendicular to the direction of gas entry flow therein, packing material comprising saddle shaped pieces disposed within said packed bed and positioned therein so as to detrain said liquid spray from said gas and trickle the liquid so detrained downwardly through said packed bed in counter-current contact with said gas passing therethrough, surfaces within said shell, which surfaces are positioned beneath said packed bed, inclined from the horizontal, and contiguous with the periphery of the lowermost portion of said bed, whereby liquid flowing downwardly from said packed bed is conducted as a film downwardly across said surfaces in counter-current flow to said gas, said liquid outlet means being located near the bottom of said shell to drain contacted liquid from said apparatus, and said gas outlet means being structurally associated with said shell to conduct contacted gas from said apparatus.

2. The apparatus of claim 1 wherein said liquid inlet means employs a spray nozzle to introduce liquid in the form of a spray.

3. The apparatus of claim 1 wherein said packed bed is substantially in the shape of a hollow cone with the open portion thereof facing downwardly towards the direction from which said gas is introduced into said packed bed.

4. The apparatus of claim 3 wherein the packing material employed in said packed bed consists of plastic saddles.

5. The apparatus of claim 3 containing a plurality of packed beds disposed vertically one above the other.

6. The apparatus of claim 1 wherein said liquid is introduced into said gas inlet means cocurrently with said gas prior to being introduced into said spray chamber.

7. An apparatus for contacting air containing fumes with a liquid whereby a major proportion of said fumes are dissolved into said liquid, comprising an outer shell, air inlet means to introduce air into a spray chamber within said shell, the cross sectional flow area of said air inlet means being less than that of said spray chamber, liquid inlet means to introduce a liquid spray into said spray chamber cocurrently with said air in said spray chamber, packing material comprising saddle shaped pieces contained within a packed bed disposed within said shell upon a perforated packing retainer which extends across the entire cross sectional area of said shell and is placed after said spray chamber in relation to the direction of air flow, said packing retainer being shaped so as to form said bed in substantially the shape of a hollow cone, and the air entry surface of said packed bed being disposed, by virtue of its' cone shape, at an angle displaced from the perpendicular to the direction of air entry therein, and surfaces within said shell disposed beneath said packed bed, inclined from the horizontal and contiguous with the periphery of the lower-most portion of said bed, whereby liquid from said packed bed flows downwardly in a thin film thereover, in counter-current contact wtih said air.

8. The apparatus of claim 7 wherein said surfaces over which liquid flows in a thin film are the interior surfaces of said outer shell.

9. The apparatus of claim 7 containing two or more of packed beds disposed vertically one above the other.

10. The apparatus of claim 7 wherein said packing material comprises saddle shaped plastic packing pieces.

11. The apparatus of claim 7 wherein said one or more packed beds are in the shape of hollow cones with the open ends of said cones facing downwardly and towards the direction from which said air is flowing.

12. The apparatus of claim 7 wherein said liquid is introduced into said air inlet means cocurrently with said air prior to being introduced into said spray chamber.

13. A method of contacting a gas stream and a liquid comprising dispersing said liquid into a liquid spray while cocurrently contacting said liquid and gas in a spray chamber contained within an outer shell, detraining said liquid spray from said gas in a packed bed of liquid-gas contacting material comprising saddle shaped pieces supported on a perforated packing retainer which is shaped so as to form said bed in substantially the shape of a hollow cone, and which extends across substantially the entire cross sectional area of said shell and of said gas stream passing therethrough, by passing said gas through said shell into said packed bed, the gas entry surface of said bed being, by virtue of its cone shape, disposed at an angle displaced from of the perpendicular to the direction of gas entry therein, passing thus detrained liquid counter-currently to said gas within said packed bed, passing detrained liquid removed from said packed bed in a thin film of liquid along wetted surfaces positioned below and contiguous to said packed bed, counter-currently to said thin film of liquid, withdrawing contacted gas from said apparatus and withdrawing contacted liquid from said apparatus.

14. The method of claim 13 wherein said liquid spray and said gas are contacted in a high gas velocity inlet prior to being contacted in said spray chamber.

15. The process of claim 13 wherein said gas is air containing fumes which are more soluble in water than is air, and said liquid is water.

16. The process of claim 15 wherein a neutralizing agent is dissolved in said water which will neutralize the vapors contained in said air.

17. An apparatus for carrying out liquid-gas contacting comprising an outer shell containing a packed bed disposed therein, said outer shell being in flow communication with each of a liquid inlet means, a liquid outlet means, a gas inlet means, and a gas outlet means, the portion of said shell adjacent said gas inlet means comprising a spray chamber, said liquid inlet means being structurally associated with said shell so as to introduce liquid into said spray chamber, thence into said shell and upwardly into said bed in the form of a spray, said gas inlet means being structurally associated with said shell so as to introduce a gas into said spray chamber within said shell in cocurrent flow contact with said liquid and thence into said packed bed, said gas inlet means being of smaller cross sectional flow area than said spray chamber whereby the velocity of said gas in said gas inlet means is higher than the velocity of said gas in said spray chamber, said packed bed being positioned within said shell and supported upon a perforated packing retainer which is shaped so as to form said bed in substantially the shape of a hollow cone and which extends across the entire cross sectional area of said shell so that the gas entry surface of said packed bed is, by virtue of its cone shape, displaced from the perpendicular to the direction of gas entry flow therein, packing material comprising ring shaped pieces disposed within said packed bed and positioned therein so as to detrain said liquid spray from said gas and trickle the liquid so detrained downwardly, through said packed bed in counter-current contact with said gas passing therethrough, surfaces within said shell, which surfaces are positioned beneath said packed bed, inclined from the horizontal, and contiguous with the periphery of the lowermost portion of said bed, whereby liquid flowing downwardly from said packed bed is conducted as a film downwardly across said surfaces in counter-current flow to said gas, liquid outlet means to drain contacted liquid from said apparatus, and gas outlet means to conduct contacted gas from said apparatus.

18. An apparatus for contacting air containing fumes with a liquid whereby a major proportion of said fumes are dissolved into said liquid, comprising an outer shell, air inlet means to introduce air into a spray chamber within said shell, the cross sectional flow area of said air inlet means being less than that of said spray chamber, liquid inlet means to introduce a liquid spray into said spray chamber cocurrently with said air in said spray chamber, packing material comprising ring shaped pieces contained within a packed bed supported upon a perforated packing retainer which extends across the entire cross sectional area of said shell and forms the bed substantially in the shape of a hollow cone disposed within said shell after said spray chamber in relation to the direction f air flow, of the air entry surface of said packed bed being disposed, by virtue of its' cone shape, at an angle displaced from the perpendicular to the direction of air entry therein, and surfaces within said shell disposed beneath said packed bed, inclined from the horizontal and contiguous with the periphery of the lower-most portion of said bed, whereby liquid from said packed bed flows downwardly in a thin film thereover, in counter-current contact with said air.

* * * * *